United States Patent [19]
Okazaki et al.

[11] 3,847,787
[45] Nov. 12, 1974

[54] DEVICE FOR SUPPLYING DRINKING WATER

[75] Inventors: Tatsuo Okazaki; Toshio Okazaki; Nobuko Karasawa; Masako Arai, all of Fukuokachoni, Japan

[73] Assignee: Okazaki Manufacturing Company Limited, Tokyo, Japan

[22] Filed: Aug. 16, 1972

[21] Appl. No.: 281,046

[30] Foreign Application Priority Data
Aug. 19, 1971  Japan.............................. 46-63201
Dec. 30, 1971  Japan.............................. 46-2394
Feb. 29, 1972  Japan.............................. 47-20865

[52] U.S. Cl................ 204/301, 204/151, 204/229, 204/263
[51] Int. Cl............................................. C02b 1/82
[58] Field of Search ............ 204/301, 151, 229, 263

[56] References Cited
UNITED STATES PATENTS
| | | | |
|---|---|---|---|
| 975,835 | 11/1910 | Damköhler et al. | 204/301 X |
| 1,889,779 | 12/1932 | Ebert et al. | 204/301 X |
| 2,093,770 | 9/1937 | Billiter | 204/151 |
| 2,767,135 | 10/1956 | Juda et al. | 204/151 X |
| 2,793,183 | 5/1957 | Thurman | 204/151 |
| 3,068,166 | 12/1962 | Miserocchi | 204/301 |
| 3,322,574 | 5/1967 | Justi et al. | 204/310 X |
| 3,461,060 | 8/1969 | Nellen | 204/301 |

FOREIGN PATENTS OR APPLICATIONS
| | | | |
|---|---|---|---|
| 470,931 | 1/1929 | Germany | 204/229 |
| 615,619 | 6/1935 | Germany | 204/229 |

*Primary Examiner*—John H. Mack
*Assistant Examiner*—A. C. Prescott
*Attorney, Agent, or Firm*—Ernest G. Montague; Karl F. Ross; Herbert Dubno

[57] ABSTRACT

A device for supplying drinking water comprises a negative electrode chamber, a positive electrode chamber, and a porous partition for the chambers and through which cation particles are carried to the negative electrode chamber by the electroosmosis. By the supplying device, a water body including a plurality of cation particles is produced from a natural water body. The supplying device particularly includes an automatic control system with an actuating mechanisms adapted to cause the chambers to be supplied with the natural water and after the intermediary operations, to result in the production of alkalified water.

7 Claims, 21 Drawing Figures

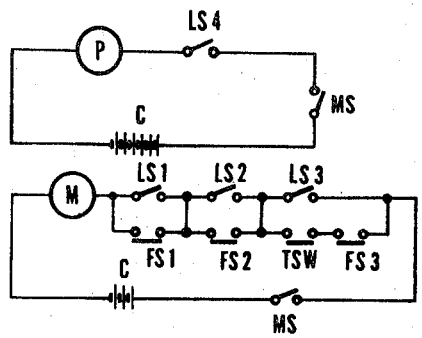
*FIG. 6*
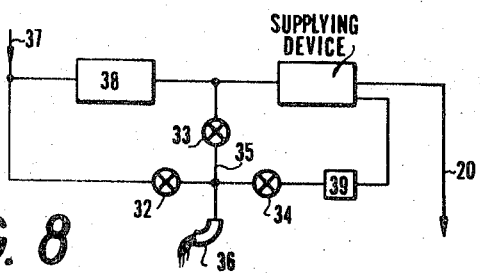
*FIG. 7*
*FIG. 8*

DEVICE FOR SUPPLYING DRINKING WATER

This invention relates to a device for supplying drinking water which involves a plurality of cation particles.

Recently, it has been recognized that drinking water including a plurality of cation particles is available to promote health.

An object of this invention is to provide a device for supplying improved drinking water for users without a complicated operation.

Another object of this invention is to provide a device for supplying improved drink water, to a preserving tank by means of an automatic control system.

The other objects and features of this invention will be apparently understood from the following description with reference to the accompanying drawings, in which:

FIG. 6 is an electric circuit of the automatic control system;

FIG. 7 is a time table of the supply device;

FIG. 8 is a diagram of the constitution of water lines associated with the supply device;

Figure 1:
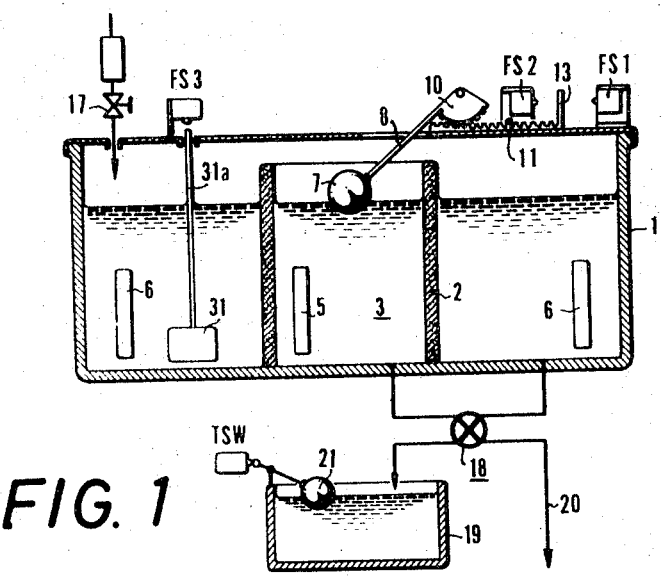
FIG. 1 is a diagrammatic cross-sectional view of a device for supplying drinking water embodying the present invention.
Figure 2C:
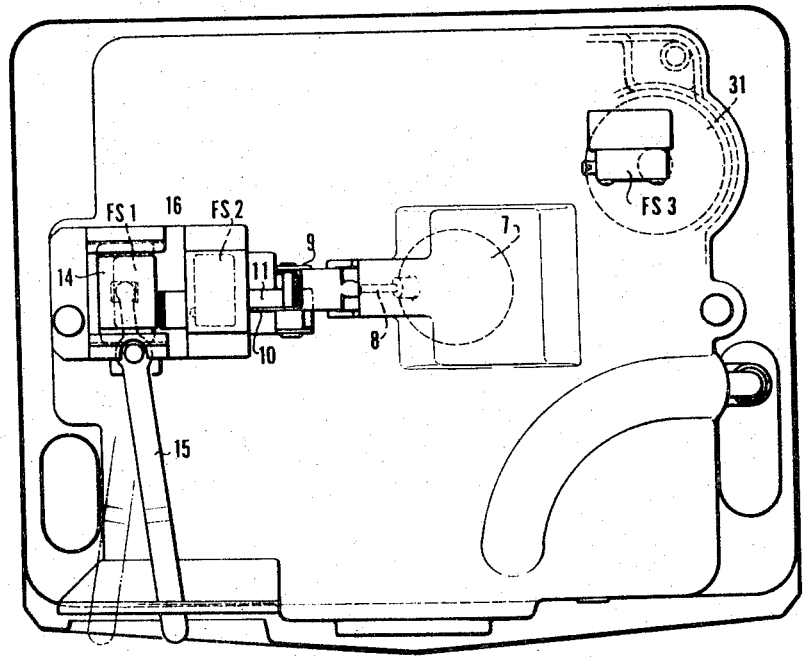
FIG. 2c is a plan view of said supplying device.
Figure 2A:
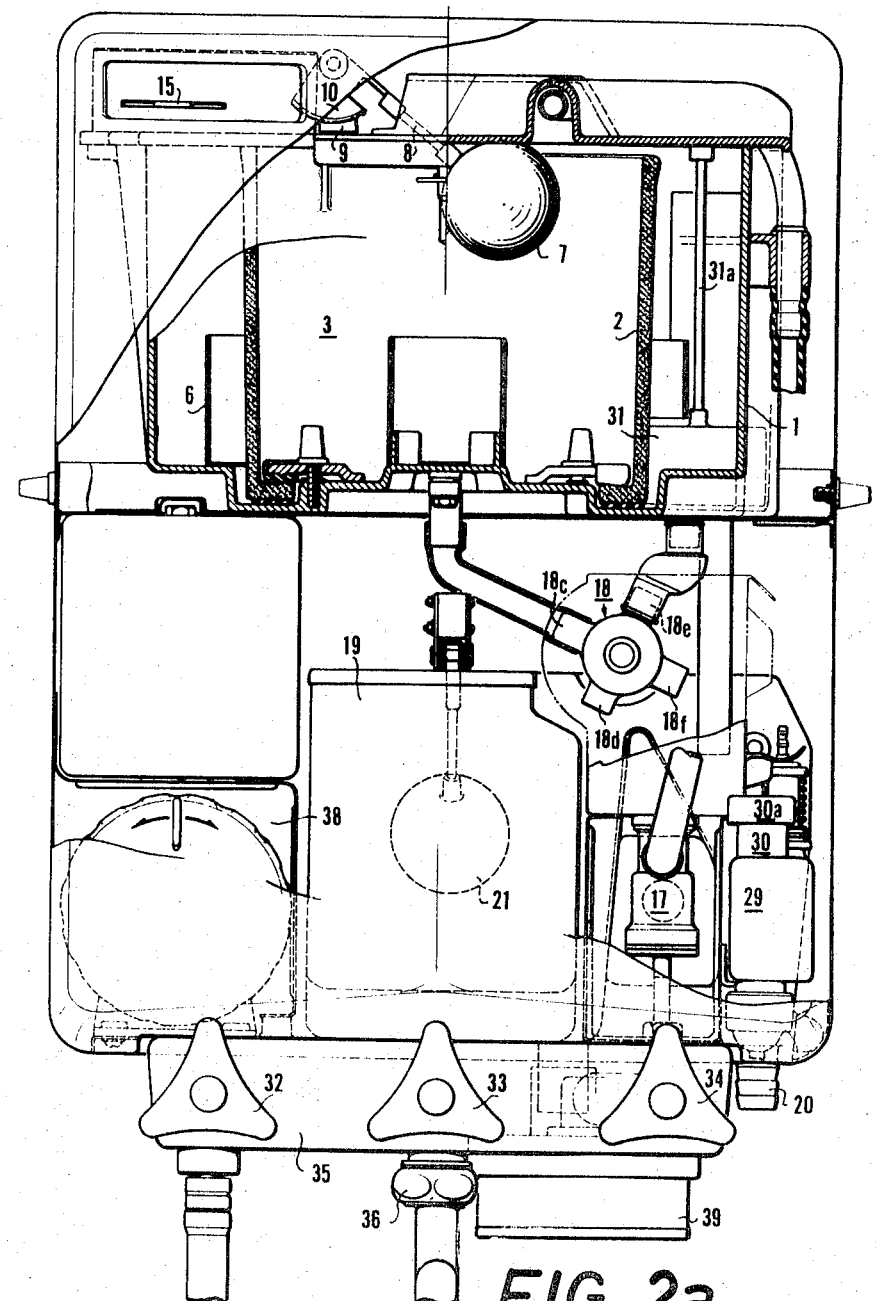
FIG. 2a is a front view of the supplying device of FIG. 1 partly broken away.
Figure 2B:
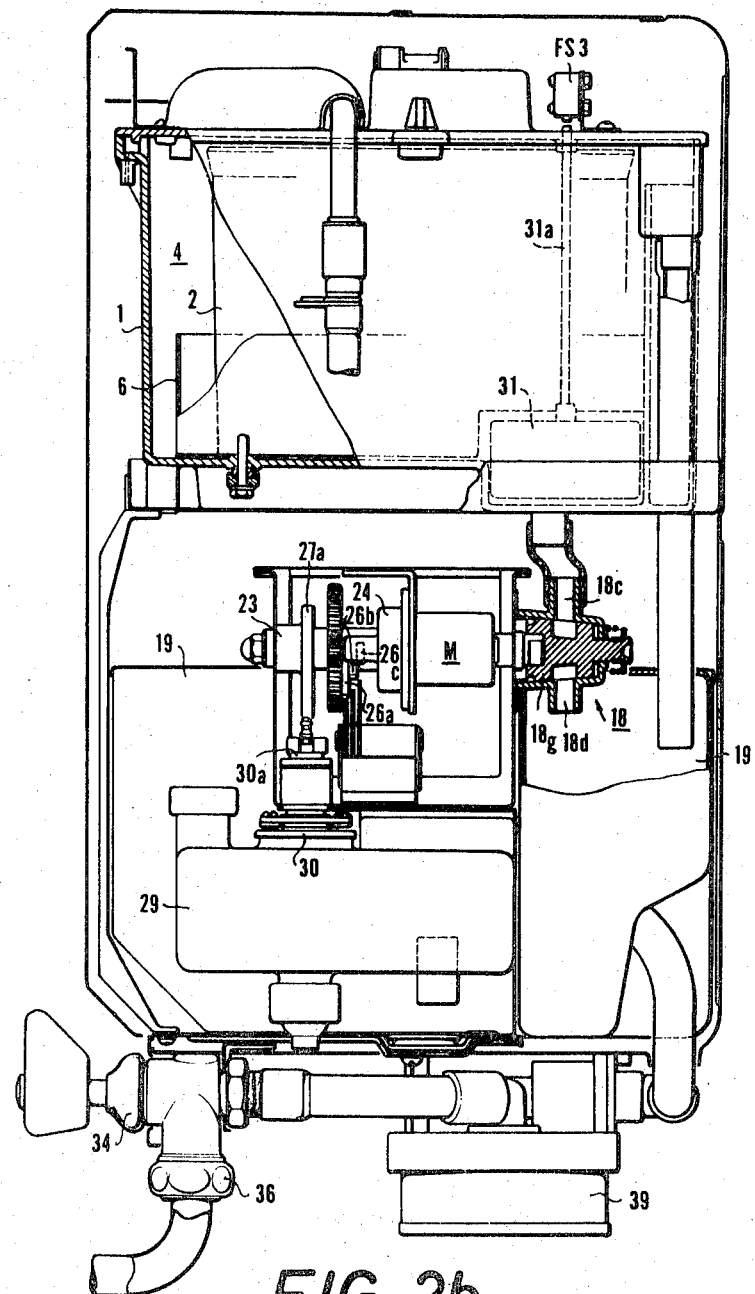
FIG. 2b is a side view of the supplying device of FIG. 1 partly broken away.
Figure 3:
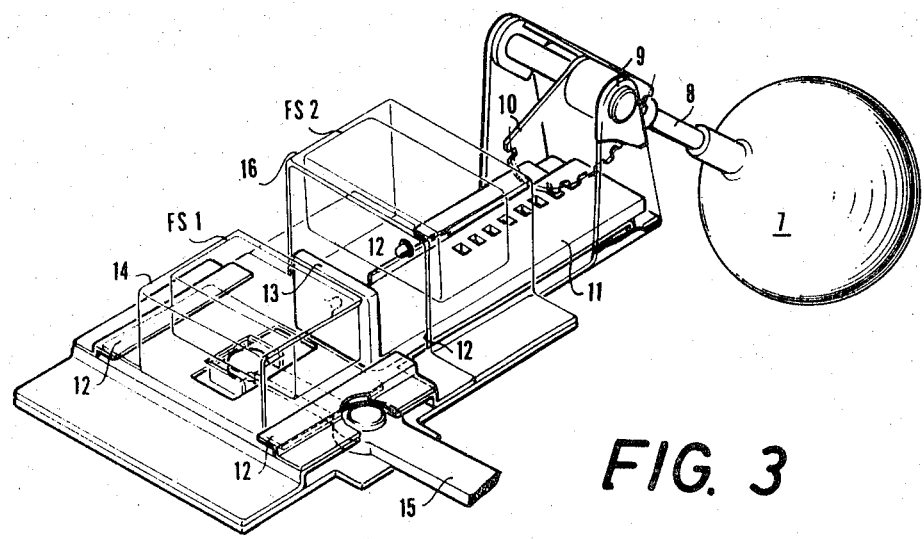
FIG. 3 is a perspective view of a float switch device involved in the supplying device.

FIGS. 1 to 8 indicate a device for supplying drinking water firstly embodying the present invention. The supplying device comprises a vessel 1, the interior of which is compartmentalized by a porous partition 2, such as an unglazed pot or biscuit, into two chambers 3 and 4, one of which has a negative electrode 5 disposed therein and the other of which has a positive electrode 6 disposed therein. The partition 2 is preferably formed into a hollow cylindrical biscuit having 2 to 3 micron diameter pores. In the negative electrode chamber 3 there is disposed a float member 7 having a swingable rod 8, the free end of which is pivotally supported to a bearing member 9 mounted on the top plate of the vessel 1. A sector gear 10 is attached to the pivot portion of the swingable rod 8 and intermeshed with a rack 11 guided movably in a horizontal direction by a pair of guide rails 12 (FIG. 3) disposed on the top plate. Limit switches FS-1 and FS-2 are disposed on the top plate and have respective push buttons facing the front and rear surfaces of a contact member 13 integrally formed with the rack 11. The limit switch FS-1 is attached to a holder 14 slidable along the guide rails 12 and which is positioned at a desired position by means of an adjusting lever 15 pivotally supported to the top plate of the vessel 1. The limit switch FS-2 is attached to a holder 16 fixedly extending over the guide rails 12.

The supplying device further involves means for supplying natural water to the chambers 3 and 4, the supplying means comprising a water valve 17 in this embodiment. The supplying device further involves a valve system 18 disposed between the negative electrode chamber 3 and a tank 19, which is disposed under the vessel 1 for holding a body of water including a plurality of cation particles. The valve system 18 may preferably consist of a four-way valve as illustrated in the drawings. The four-way valve 18 comprises a valve housing 18a having a valve chamber 18b and four passages 18c, 18d, 18e and 18f, and a valve rotor 18g having two passages 18h and 18i formed therein parallel to each other, so that the four-way valve 18 is adapted to form a path for communicating the chambers 3 and 4 with each other by the passages 18c, 18e and 18h when the valve rotor 18g is rotated to a position illustrated in FIG. 4b, and to form paths for communicating the negative electrode chamber 3 and tank 19 with each other by the passages 18c, 18d, and 18i, and the positive electrode chamber 4 and a drain tube 20 with each other by the passages 18e, 18f, and 18h respectively. Accordingly, the four-way valve 18 is operated in order of the illustrations of FIGS. 4a to 4d. Namely, FIG. 4a indicates a starting position when the valve rotor 18g is driven by means of an electric motor M, FIG. 4b indicates a position when the valve rotor 18g is rotated for one fourth rotation from the starting position, FIG. 4c indicates a position when the valve rotor 18g is rotated for three eighths rotation from the starting position so that the chambers 3 and 4 are mutually separated by the body of the valve rotor 18g, and FIG. 4d indicates a position when the valve rotor 18g is rotated for a half rotation from the starting position so that the water body including a plurality of cation particles flows down from the negative electrode chamber 3 to the tank 19 and the water body, including a plurality of aionic particles, flows down from the positive electrode chamber 4 to the drain tube 20. Before a cycle of the supplying device of this invention is finished, the valve rotor 18g is rotated for a half rotation so as to be returned from the position of FIG. 4d to the position of FIG. 4a.

In the tank 19 there is disposed a float member 21 and on the top of the tank 19 there is mounted a limit switch TSW, which is set so as to be closed in response to the action of the float member 21 when the water level of the tank 19 due to the expenditure of the water is lowered to a predetermined level.

Figure 5:
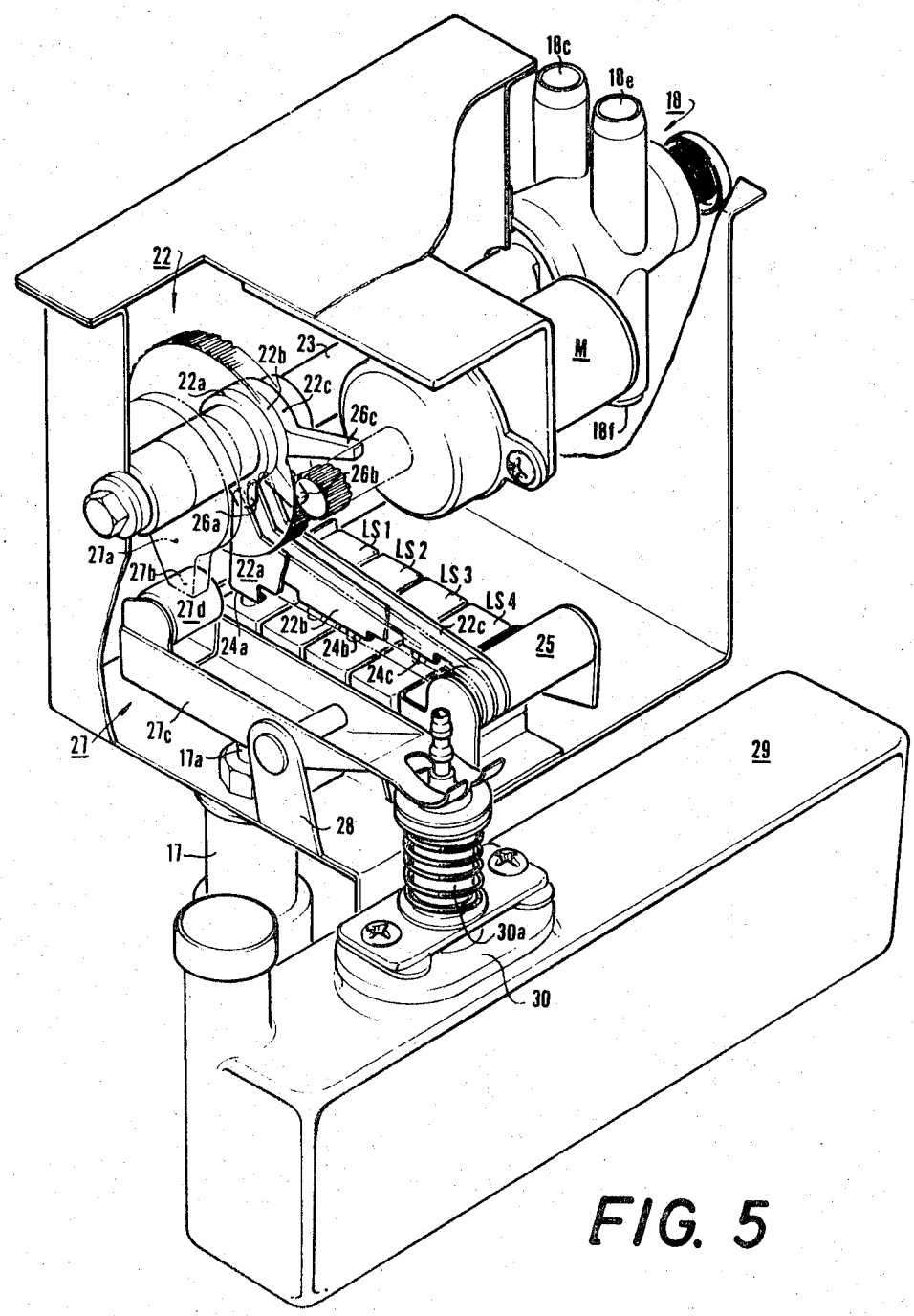
FIG. 5 is a perspective view of a mechanical assembly involved in an automatic control system for operating said supply device for a cycle.

The supplying device further comprises an automatic control system having a mechanical assembly as shown in detail in FIG. 5. The mechanical assembly 22 is associated with a rotor shaft 23 driven via a reducer 24 by a motor M and connected with the valve rotor 18g.

The mechanical assembly 22 includes cam members 22a, 22b, and 22c attached to the rotor shaft 23 in tandem, and levers 22a', 22b', and 22c' disposed to face the respective cam members, having pushing protrusions 24a, 24b and 24c respectively and the ends of which are pivotally supported to a common shaft 25 attached to the frame of the mechanical assembly 22.

On the frame are disposed limit switches LS-1, LS-2, LS-3, and LS-4 in such a manner that the limit switch LS-1 is operatively disposed opposite to the protrusion 24a, the limit switches LS-2 and LS-3 are opposite to the protrusion 24b, and limit switch LS-4 is opposite to the protrusion 24c. The limit switch LS-3 is a normal open type, and each of the other limit switches LS-1, LS-2, and LS-4 is a normal closed type.

The cam members 22a, 22b and 22c are provided with protrusions 26a, 26b and 26c mutually positioned by a phase difference of 45° in a rotating direction of the rotor shaft 23 and are operated to push the free ends of the levers 22a', 22b' and 22c' separately, so that the limit switches LS-1 . . . are individually switched by the action of the lever.

A device 27 is provided for actuating the water valve 17 by alternately placing it in open and closed conditions. The actuator 27 comprises a cam member 27a particularly attached to the rotor shaft 23 and having a protrusion 27b, and a lever 27c disposed under the cam member 27a with the middle portion of the lever 27c pivoted to a bearing 28 mounted on the frame, the lever 27c having a roller 27d touchably facing the protrusion 27b. The lever 27c pushes the top of a valve stem 17a involved in the water valve 17, against the biasing of a spring (not shown) for maintaining the water valve 17, when the protrusion 27b pushes down the roller 27d. Accordingly, the water valve 17 is opened by such operation. The phase of the position of the protrusion 27b corresponds with that of the protrusion 26a in the rotating direction of the rotor shaft 23.

The supplying device of the present invention further includes means for adding an additive when the natural water is supplied to the chambers 3 and 4. The additive is selected from the group consisting of metals and compounds containing metal, for example, calcium chloride.

The adding means comprises a tank 29 for containing the additive in liquid, and a plunger pump 30 having a plunger (not shown) and an actuating rod 30a reciprocating with the swing motion of the lever 27c for a portion of the additive to be supplied to the chambers 3 and 4. The plunger pump 30 is operated by the motion of the lever 27c when the water valve 17 is opened, so as to suck up the liquid additive into the pump chamber, and by the next motion of the lever when the water valve 17 is closed, so as to deliver the liquid to the chambers.

The above-mentioned positive electrode chamber 4 includes a vertical slide guide attached to the top plate of the vessel 1. A float number 31 is disposed in the chamber 4 and has a stem 31a vertically movable along the slide guide and projecting upwards through a hole formed in the top plate. To the upper portion of the top plate there is attached a limit switch FS-3 of a normal closed type having an operating button contactably facing the top end of the stem 31a, so that the limit switch FS-3 is closed with its button being free from contacting the stem 31a when the float member 31 is lowered due to a discharge of the water from the chambers 3 and 4.

The electric circuit of the switch control device 22 is illustrated in FIG. 6 in which to the terminals of a direct current source C are connected via a main switch MS, the electrodes P (the negative and positive electrodes 5 and 6) and limit switch LS-3 serially connected with each other, and via the main switch MS and limit switch TSW the limit switches LS-1, LS-2 and LS-4 serially connected with each other. The respective limit switches FS-1, FS-2 and serially connected limit switches TSW and FS-3 are connected parallel to the respective limit switches LS-1, LS-2 and LS-4 in order.

In operation, the water level due to the expenditure of the drinking water contained in the tank 19 is lowered to the predetermined level so that the switch TSW is closed by the action of the float member 21. Since the switch FS-3 has been closed in this stage (this reason will be explained hereinafter), the motor M is energized. By driving the motor M, the rotor shaft 23 is rotated until the valve rotor 18g moves from a position of FIG. 4a to that of FIG. 4b, so that the protrusion 26c is released from the contact with the lever 22c' thereby causing the protrusion 24c to be removed from the operating element of the switch LS-4 and causing the switch LS-4 to turn into a closed position. At the stage that the valve rotor 18g travels to a position of FIG. 4b, the protrusion 26a pushes down the lever 22a', thereby causing the protrusion 24a to be brought into contact with the operating element of the switch LS-1 and to cause the switch LS-1 to open. Accordingly, the motor M is de-energized so as to stop, and simultaneously the cam protrusion 27b pushes the lever 27c downwardly, thereby causing the valve stem to be pushed down so that the water valve 17 is opened.

Figure 4A:
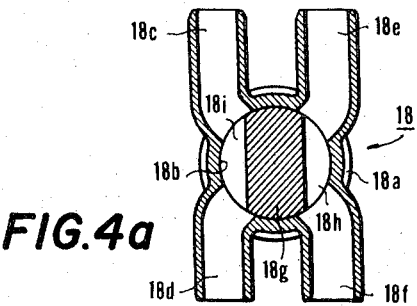
FIGS. 4a, 4b, 4c and 4d are vertical cross-sectional views of a four-way valve involved in the supply device in different positions of the cycle.
Figure 4B:
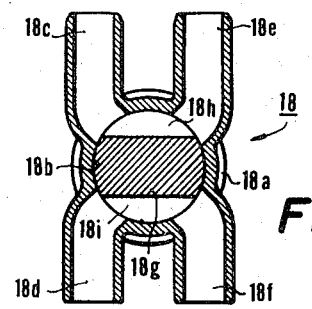

The chambers 3 and 4 are filled with the natural water from the water valve 17 at the same level because the chambers 3 and 4 communicate through the path of the four-way valve 18 illustrated in FIG. 4b, so that the float member 31 is moved upwardly and the limit switch FS-3 is opened.

When the float member 7 floats upwardly to the prescribed level, the sector gear 10 is rotated to cause the rack 11 to be shifted thereby causing the contact member 13 to be released from contacting the button of the limit switch FS-1 and the resultant closed state of the switch FS-1.

And then the motor M is further energized so as to cause the rotor shaft 23 to be rotated so that the protrusions 26a and 27b are disengaged from the levers 22a' and 27c, whereby the switch LS-1 is closed and the water valve 17 is closed. The actuation of the lever 27b results in supplying the liquid additive from the tank 29 to the positive electrode chamber 4 by the pumping operation of the plunger pump 30.

Figure 4C:
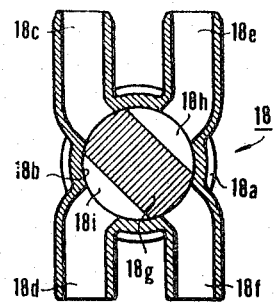

By the rotation of the rotor shaft 23 for an angle of 45°, the valve rotor 18g is moved from the position of FIG. 4b to that of FIG. 4c. At this stage, the protrusion 26b pushes down the lever 22b' so that the pushing protrusion 24b is lowered to push the operating elements of the switches LS-2 and LS-3, thereby causing the switch LS-2 to be opened and the switch LS-3 to be closed. Accordingly, the motor M is stopped and the electrodes P are energized by the supply current. During the ionization, the cation particles are carried through the partition 2 from the positive electrode chamber 4 to the negative electrode chamber 3 by the operation of electroosmosis so that the water level in the negative electrode chamber 3 shifts upwardly and the water body in the positive electrode chamber 4 is acidified by a plurality of anionic particles remaining in this water body.

The water body in the negative electrode chamber 3 is preferably adjusted to include a plurality of cation particles, in such a manner that this water body is so alkalized as to have pH of 8.2. For this purpose, in this embodiment, the body of the limit switch FS-1 is shifted by the operation of the lever 15 so as to change the switching point of said switch FS-1 in association with a level different from that at which the float member 7 is originally operated for switching of the switch FS-1 positioned at a first place.

When the float member 7 moves upwardly by the operation of electroosmosis, the sector gear is further rotated causing the rack 11 to be shifted and the contact member 13 to be brought into contact with the button of the limit switch FS-2 and the resultant closed state of the switch FS-2. Consequently, the motor M is driven further and the protrusion 26b is released from the pushing position to the lever 22b' so that the switch LS-2 is closed and the switch LS-3 is opened, with the resultant end of the ionization.

Figure 4D:
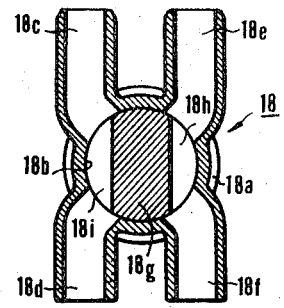

When the motor M is rotated by an angle of 45° and the valve rotor 18g reaches the position illustrated in FIG. 4d, the protrusion 26c pushes the lever 22c' and then the protrusion 24c causes the switch LS-4 to open, with the resultant stopping of the motor M. Consequently, the alkalized water body including a plurality of cationic particles flows down through the four-way valve 18 from the negative electrode chamber 3 to the tank 19 so that the float member 21 is upwardly moved so as to cause the switch TSW to be opened. And the water body including a plurality of anionic particles flows down through the four-way valve 18 from the positive electrode chamber 4 to the drain 20. When the water body is removed from the positive electrode chamber 4, the float member 31 is lowered so as to cause the limit switch FS-3 to be closed. Accordingly, one cycle of the supplying device of this invention is completed, and the next cycle is started when the water level in the tank 19 is lowered and the motion of the float member 21 causes the limit switch TSW to close.

In this embodiment, the supplying device of the present invention preferably includes water line assemblies as illustrated in FIG. 8. Namely, three cocks 32, 33 and 34 communicate through a common water line 35 with a spout 36. The cock 32 directly communicates with a water main line 37, the cock 33 communicates with the main line 37 via a strainer 38, and the cock 34 communicates with the main line 37 via the strainer 38, the water supplying device of the present invention and a secondary strainer 39 arranged in series.

In order to deliver the natural water from the spout 36, the valve 32 only is open with the valves 33 and 34 closed; and to deliver the cleaning water from the spout 36, the valve 33 only is open with the valves 32 and 34 closed. Furthermore, in order to deliver the drinking water including a plurality of cation particles from the spout 36 via the tank 19, the valve 34 only is open with the valves 32 and 33 closed.

Figure 9:
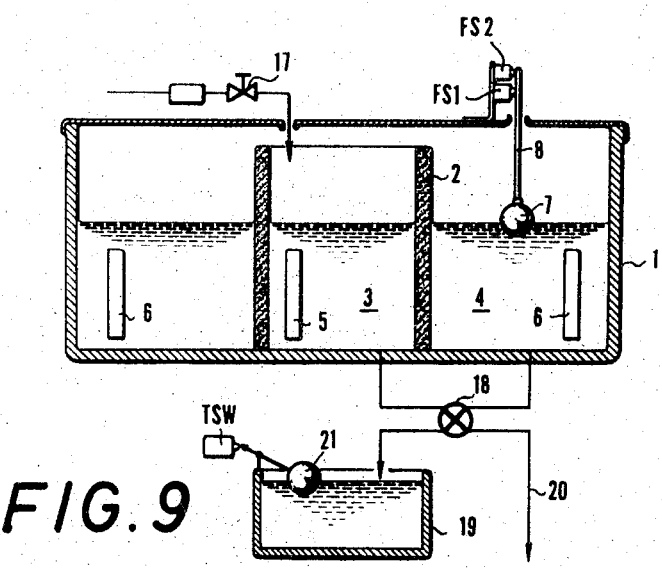
FIG. 9 is a diagrammatic cross-sectional view of a device for supplying drinking water modified from that of FIG. 1.

FIG. 9 indicates another embodiment of the present invention modified from that of the first embodiment, wherein a float member 7 is disposed in a positive electrode chamber 4 and has an operating rod 8 vertically moved so as to switch nearby limit switches FS-1 and FS-2 vertically arranged relative to each other.

Figure 11:
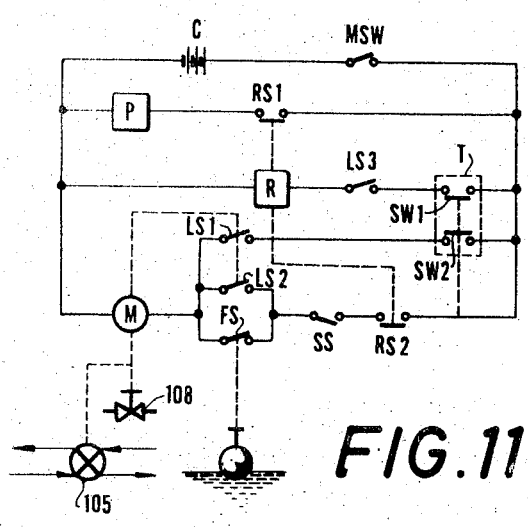
FIG. 11 is an electric circuit of the automatic control system of FIG. 10.
Figure 10:
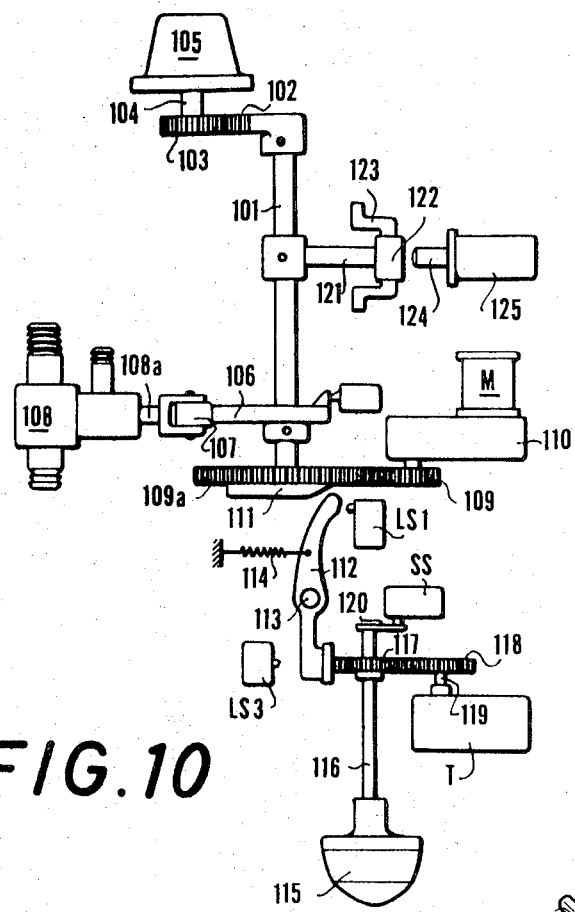
FIG. 10 is a diagrammatic view of another embodiment of the automatic control system particularly involving a timer.

Another embodiment of the automatic control system involving a timer is illustrated in FIGS. 10 and 11. The automatic control system involves a rotor shaft 101 having a sector gear 102 intermeshing with a pinion 103 formed in a rotor shaft 104 connected with a valve rotor involved in a four-way valve 105 having the same construction as that of the first embodiment. The rotor shaft 101 has a cam member 106 touching a roller 107 mounted to the end of a valve stem 108a of a water valve 108 having the same construction as that of the first embodiment, so that the water valve 108 is opened by the cam member 106 pushing the roller 107. A normally closed type limit switch LS-2 is operated when the cam member 106 is rotated for a prescribed angle. To the end portion of the rotor shaft 101 there is secured a gear 109a intermeshed with a gear 109 mounted on the output shaft of a reducer 110, the gear 109a having cam member 111 formed on the surface thereof. A pivot lever 112, which is swung by the cam member 111, is pivoted at the middle portion by means of a pivot 113 and biased by means of a spring 114. A normally closed type limit switch LS-1 is operated when the cam member 111 pushes the button of the switch LS-1 due to the rotation of the reducer shaft, the end of the pivot lever 112 facing a normally open type limit switch LS-3 which is opened by the lever 112 swinging against the biasing of the spring member 114.

The control system further includes means for manually setting a cyclic operation of the water supplying device. Namely, the control system comprises a set knob 115 having a shaft 116 to which is secured a gear 117 intermeshed with a gear 118 secured to a set shaft 119 of a timer T. To the end of the shaft 116 there is attached an operating member 120 for operating a normally open type limit switch SS. The set shaft 119 can be stopped by using a braking caused by the lever 112 touching to the gear 117 by the biasing of the spring 114.

Preferably, a cam member 121 is secured to the rotor shaft 101 and brought into contact with a roller 112 attached to a crank shaft 123. The roller 122 acts to operate a plunger member 124 of a reciprocating pump assembly 125 for supplying the additive to the electrode chambers.

An electric circuit of the control system is indicated in FIG. 11. In this figure, electrodes P (the negative electrode 5 and positive electrode 6) and a normally open type relay switch RS1 are arranged in series to each other, and are connected with both terminals of a direct current source C via a main switch MSW. Between the terminals of the current source C there are arranged in series a motor M, the limit switch LS1, a normally close type switch SW2 included in the timer T, via the main switch MSW, and between one of the terminals of the source C and a connecting point of the motor M there is a switch SS for starting operation and a normally close type relay switch RS2. A limit switch FS is arranged parallel to the source C positioned between the connecting points of the switch LS2.

The relay switches RS1 and RS2, limit switch LS3 and a normally open type switch SW1 in timer T are arranged in series between the terminals of the source C.

In operation, the knob 115 is operated so as to cause the switch SS to be closed and simultaneously the timer T to be set on, whereby the switch SW1 is closed and the switch SW2 is opened. In this stage, the motor M is driven due to a closed circuit formed by the switch LS2, SS and RS2 so as to rotate the rotor shaft 101. The valve rotor of the four-way valve 105 turns from a position of FIG. 4a to that of FIG. 4b so that the switch LS2 is opened by the operation of the cam member 106 thereby causing the motor M to stop. The cam member 106 acts to open the water valve 108 and the chambers are filled with the natural water through the water valve 108. In this case, since the chambers communicate with each other through the four-way valve 105, the water of both chambers rise by the same level. When the water level of the chambers reaches a prescribed level, the upwardly shifting of a float member disposed in the chamber results in closing of the switch FS so as to drive the motor M again, and then to close the switch LS2.

By the motor M being driven, the valve rotor travels to a position of FIG. 4c so that the cam member 111 acts to swing the lever 112 against the bias of the spring 114, to close the switch LS3 and to release the timer T from the brake, wherein the water valve 108 is closed. By the closing of the switch LS3, the relay R acts to close the switch RS1 and then the electrodes are energized. Simultaneously, the switch RS2 is opened and the motor is stopped. After the prescribed time, the timer T is automatically changed to cause the switch SW1 to be opened, to cut the supply of the electric current to the relay R, and to cause the switch SW2 to be closed. Accordingly, the relay switches RS1 and RS2 are alternately changed to cause the electrodes P to be disenergized and the motor M to be driven, thereby rotating the shaft 101. In this stage, during the operation of the time T, the shaft 116 is rotated via the gears 108 and 109 by the rotation of the set shaft 119, so that the switch SS is opened. Therefore, the current is supplied to the motor M via the switch LS1 and SW2 when the time T is automatically changed.

By the rotation of the shaft 101, the cam member 106 acts to open the switch LS1 so as to cause the motor M to be stopped, wherein, the valve rotor travels from a position of FIG. 4c to that of FIG. 4d.

In this stage, the drinking water having a plurality of cationic particles in the negative electrode chamber flows down through the path of the four-way valve 105 to the storage tank and the remaining water in the positive electrode chamber flows down through the other path of the four-way valve 105 to the drain, so that one cycle of operation for supplying the drinking water is completed.

The set knob 115 for setting the switch SS and the timer T may be replaced by a float member disposed in the storage tank and a limit switch associated with the float member. In this case, the limit switch due to the motion of the float member is closed to cause the shaft 116 to be rotated until the switch SS and the timer T are set on.

A third embodiment of this invention is illustrated in FIGS. 12 to 15, wherein there is provided means for manually setting a starting place of one cycle operation of the water supplying device. Namely, the water supplying device of this embodiment comprises a vessel 201 the interior of which is divided to form two chambers 202 and 203 by a porous partition 204, for example, a hollow cylindrical biscuit.

The chamber 203 has a negative electrode 205 disposed therein. The partition 204 has an upper overflow edge 204a over which the natural water flows from the chamber 203 to the chamber 202 after the chamber 203 is filled with said water body.

In the negative electrode chamber 202 is disposed a float member 207 suspended by an actuating lever 208 in such a manner that the float member 207 is vertically movable, said lever 208 being pivoted by a pin 208a positioned on the top plate of the vessel 201. To the end portion of said lever 208 is pivoted a co-operating rod 209 vertically extending and having its lower end connected with a member 210 for actuating a four-way valve 211 which has the same construction as that of the first embodiment.

The four-way valve 211 has four conduits 211a, 211b, 211c and 211d. The conduit 211a communicates with the negative electrode chamber 203, the conduit 211b with a storage tank 212, the conduit 211c with the positive electrode chamber 204, and the conduit 211d with a drain tube 213. A valve rotor 211e of said valve 211 is connected with a cam shaft 214 to which a rotor shaft 215 is coaxially pivoted. A first operating member 216 is fixed to the latter shaft 215 and a second operating member 217 to the former shaft 214. An engaging member 216b is attached to the latter shaft 215, and a member 216b to be engaged is attached to the former shaft 214. The respective operating members 216 and 217 have respective engaging portions 216a and 217a which are mutually biased by a tension spring member 218. The operating member 216 further has a fixed pin 219, and a fixed portion 220 is secured to an operating lever 221a included in a water valve 221 having the same construction as that of the first embodiment. The pins 219 and portion 220 are mutually biased by a tension spring member 222.

The operating member 216 has a cam 216c formed on the under surface thereof and touching a roller 223 rotatably supported to the end of said lever 221a.

An engaging member 224 is slidably supported to a frame 225 and biased by a tension spring 226 in a horizontal direction, normal to that in which the operating members 216 and 217 are rotated. The top end of the engaging member 224 is formed into two engaging portions 224a and 224b arranged in a sidewise direction and each having a rounded surface under there so as to be engaged with and disengaged from said engaging members 126b and 217b. The engaging portion 224b is protruded further toward the engaging member 217b than the other 224a toward the engaging member 216b, so that when the engaging member 224 is retracted against the bias of the spring 226, the engaging portion 224a is firstly disengaged from the engaging member 216b and the other 224b is nextly from the engaging member 217b.

The engaging member 224 further has a groove 224c formed between the engaging portions 224a and 224b and engaged with a nail 210a formed on the free end of said actuating member 210.

The members 216 and 217 face a stopper 225 pivoted to the frame so that the stopper 225 defines the timing of the rotor shaft 215. The stopper 225 has an engaging portion 225a which is capable of being inserted into an interval formed between said engaging portion 216a and 217a, and of preventing the member 216 from being rotated in a direction opposite to that in which the member 216 is biased by means of the spring 218.

The water valve 221 has a valve stem 221b biased by means of a spring member in an upper direction, as shown in the drawings, so as to prevent the communication of an inlet 221c and outlet 221d. The top end of the valve stem 211b touches the under portion of the operating lever 221a and is pushed down by the lowering of said lever 221a so as to allow the communication of said inlet and outlet. The operating lever has a middle portion pivoted to the frame and a free end portion vertically facing the top end of a piston rod 226 involved in a device for adding the edible liquid additive described hereinafter. The adding device further comprises a storage tank 227 for containing the dible liquid additive, and communicated with a check valve 227 involving the piston rod 226.

At one corner of the positive electrode chamber 203 there is disposed a hollow cylinder 232 having an upper chamber 232a and a lower chamber 232b. The lower chamber 232b communicates with the negative electrode chamber 202. A partition wall 232c comparting the chambers 232a and 232b has a communicating port 232d. The under edge of said wall 232c surrounding the port 232d is formed into an annular valve seat 232e.

In the lower chamber 232b is disposed a ball-shaped float member 233 touchable to the seat 232e. The partition wall 232c further has an orifice 232f communicating with the chambers 232a and 232b. In the upper chamber 232a is disposed a ball-shaped float member 234 having a vertical road 234a associated with a limit switch 235 of a normal open type disposed to the top plate of the cylinder 232. A normal close type limit switch 236 is connected in series with the limit switch 235 and is adapted to be switched by the pressing operation of an operating member 237 mounted on the lever 221a.

The pin 208a for swingably supporting the lever 208 can be shifted in such a manner that the leverage of the lever 208 is adjusted.

The co-operating rod 209 has a vertical slit 209a through which are slidable inseted a pair of pins 238 mounted on a hollow-cylindrical frame 239, so that the motion of the rod 209 is limited by a distance in a vertical direction.

The lever 208 has a guide slit 208b extending in the lengthwise direction thereof and through which is slidably inserted the first-mentioned pin 208a which is secured to a rack member 240 movable along the lengthwise direction of the lever 208. A pinion 241 is intermeshed with the rack member 240 and secured to a shaft 242 extending in a direction normal to that in which the lever 208 extends. The shaft 242 is journaled and has its one end provided with a knob.

Accordingly, the rack member 240 is shifted by the rotation of the knob, i.e., the pinion 241 so that the pin 208a travels in the slit 208b and causes the leverage of the lever 208 to be adjusted.

Figure 14:
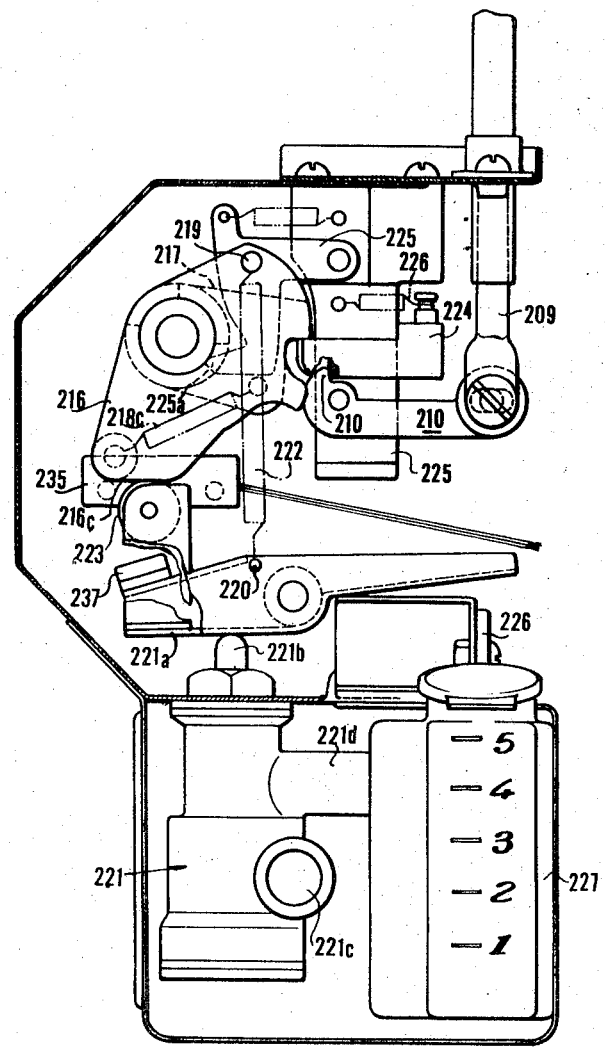
FIG. 14 is a side view of a switch device involved in the automatic control system of FIG. 12.
Figure 15:
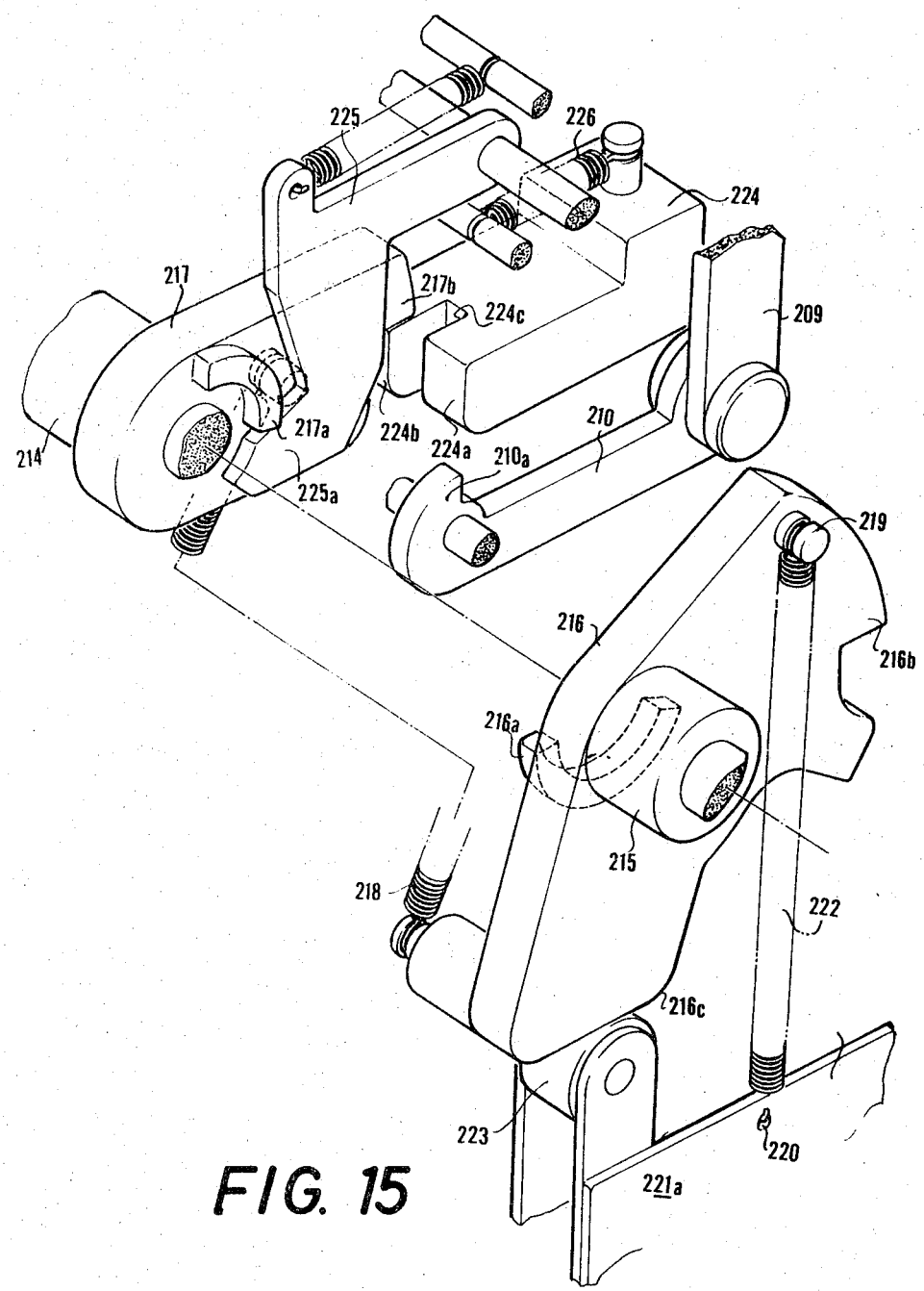
FIG. 15 is a perspective view of the switch device of FIG. 14.

In operation, when the rotor shaft 215 is rotated in an anti-clockwise direction as shown in FIG. 14, the engaging member 217a is rotated together with the member 216a so as to cause the engaging portions 216b and 217b to be engaged with the portions 224a and 224b. In this stage that the engaging portion 217b is engaged with the portion 224, the engaging portion 216b still is rotated over the portion 224a in the anti-clockwise direction. When the force applied to the rotor shaft 215 is released, the operating member 216 is returned in a clockwise direction by the bias of the spring member 218 until the engaging portion 216b is engaged with the portion 224a, and to cause a space to be formed between the members 216a and 217a.

At this stage, the engaging portion 225a of the stopper 225 slided to the peripheries of said member 216a and 217a is pushingly inserted into said space. Accordingly, the first operating member 216 is prevented from being rotated in the anti-clockwise direction before the second operating member 217 is rotated in the clockwise direction.

When the engaging member 216a fetches the member 217a, the cam shaft 214 is rotated so as to shut the four-way valve. Simultaneously, the cam surface of the member 216 pushes the roller 223 and causes the lever 221a to be turned in an anti-clockwise direction in FIG. 14, with the resultant opening state of the water valve 221.

By the water valve 221 opened, the positive electrode chamber 204 is filled with the natural water and then the water is introduced into the negative electrode chamber 203 over the overflow edge. The swinging operation of the lever 221a results in closing the limit switch 235 so as to set the electrodes 205 and 206 to be capable of being energized.

The water supplied to the negative electrode chamber 203 flows into the lower chamber 232b of the cylinder 232 so that the float member 233 reaches to its upper most level at which the float member 233 touches the seat 232e and the opening 232d is closed, and then the water is nextly introduced through the orifice 232f into the upper chamber 232a. The water level of the upper chamber 232a is shifted by a time lag in comparison with that of the negative electrode chamber 203, and the float member 234 is shifted upwards by the rising of the water level so as to switch the limit switch 236 into a close condition, and then the electrodes 205 and 206 are energized to accomplish the ionization.

When the water level of the negative electrode chamber 203 rises by the electroosmosis, the float member 207 is upwardly shifted and the lever 208 is swung. The swinging operation of the lever 208 results in lowering the co-operating rod 209, pulling the engaging member 224 backwards, disengaging the portion 224a from the engaging portion 216b so as to cause the first operating member 216 to be rotated by the bias of the spring in a clockwise direction, and simultaneously the roller 223 to be pushed by the cam surface of the member 216, and shutting the water valve.

The liquid additive is supplied to the chamber 203 by the reciprocation of the plunger 227b which is operated by the swinging of the lever 221a.

When the first operating member 216 is rotated, the tension spring 218 stretched between the members 216 and 217 is biased, so as to cause the second operating member 217 to be rotated when the engaging portion 217b is disengaged from the portion 224b. The timing of the disengaging operation of the portion 224b is delayed by a moment after the portion 224a is disengaged from the engaging portion 216b, so that the cam shaft 214 is rotated after the electrodes 205 and 206 are disenergized.

The rotation of the cam shaft 214 causes the four-way valve to be open and the water body including a plenty of kationic particles to be supplied through said four-way valve from the negative electrode chamber 203 to the storage tank 212. And the water body remaining in the positive electrode chamber 204 flows down through the four-way valve to the drain tube.

Figure 16:
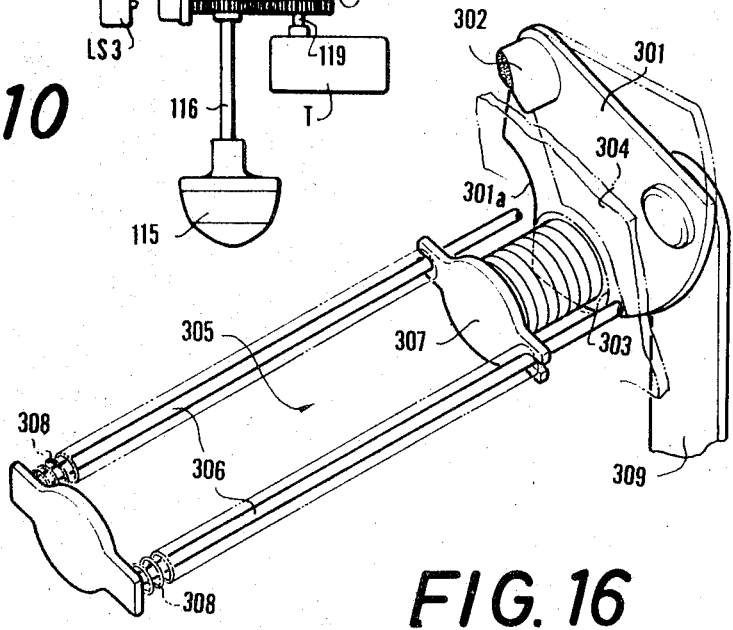
FIG. 16 is a perspective view of means for adding edible additive tablets partly demounted.
Figure 12:
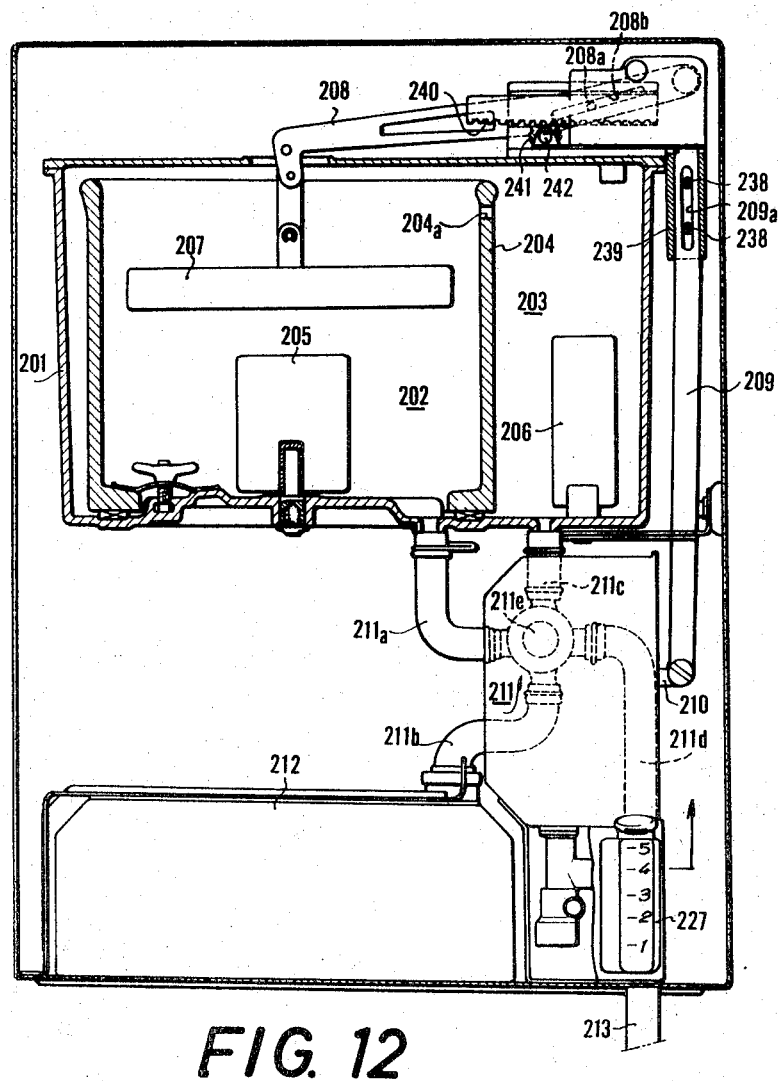
FIG. 12 is a front view of a second embodiment of the present invention partly broken away and in which an automatic control system involves a manual setting device for starting a cycle operation thereof.
Figure 13:
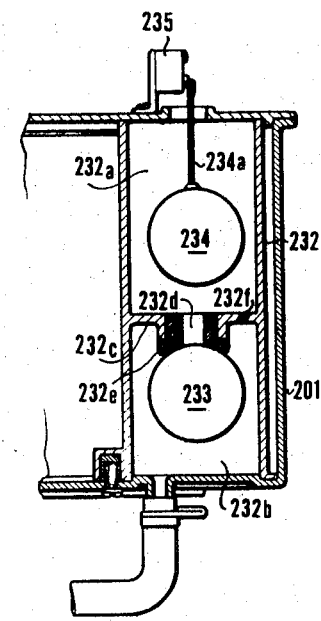
FIG. 13 is a cross-sectional side view of the embodiment of FIG. 12.

FIG. 16 indicates another embodiment of the device for adding the additive, wherein the additive is formed into a plurality of tablets. The device is positioned to the top plate of the vessel and comprises a sectorial delivering plate 301 pivoted to a stationary pin 302, an outlet hole 303 formed in a vertical wall 304 in a manner to face the sector 301, a container space 305 disposed at the backside of said wall 304, a pair of guide rails 306 disposed at both sides of said container space 305, a pushing member 307 slidably along said rails 306 and biased by means of compression spring members 308 toward the hole 303. The sector 301 is co-operated with, for example, a vertical co-operating rod 309 acting like to the rod 209 illustrated in FIGS. 12 to 15.

The tablets of the solid state edible additive are set between the wall 305 and the member 307 and delivered by the swinging of the sector 301 in a manner to push the preceding tablet by the concaved edge 301a of said sector 301 and to fall down the tablet into the electrode chamber.

We claim:

1. A device for supplying cation drinking water comprising:
    a negative electrode chamber having a negative electrode,
    a positive electrode chamber having a positive electrode,
    a porous partition for communicating said chambers and through which cation particles are carried to said negative electrode chamber and anionic particles are carried to said positive electrode chamber by ionization current applied to the electrodes,
    a tank disposed under said negative electrode chamber in order to hold a water body including a plurality of said cation particles,
    a valve system disposed between the tank and said negative electrode chamber,
    supply means for supplying natural water to both of said electrode chambers,
    a first float member positioned in said tank,
    a first switch means for switching in response to the action of said first float member when said first float member is lowered to a predetermined level due to use of the water body in said tank and actuating said supply means to supply natural water to both of said electrode chambers, operatively,
    a second float member positioned in at least one of said electrode chambers,
    a second and third switch means operatively connected to said second float member for switching in response to the action of said second float member when said second float member is moved to a first and second determined levels, respectively, in such a manner that both said chambers are filled with natural water until the water level of said at least one electrode chamber rises to said first level actuating said second switch means for terminating the supply of natural water to said electrode chambers, and the ionization being continued until the water level as a result of electro osmosis reaches said second level in said at least one of said electrode chambers actuating said third switch means for terminating the ionization current and communicating said negative electrode chamber with said tank by means of said valve system, and
    an automatic control system including: a switch control means for starting a cycle operation by a signal from said first switch means when said first float member is lowered to said predetermined level and actuating said supply means so as to cause said electrode chambers to fill with said natural water; means for actuating said supply means in reverse so as to stop the supply of said natural water by a signal from said second switch means when the water level in said at least one electrode chamber reaches said first determined level; means for starting the said ionization current to the electrodes; means for stopping said ionization current by a signal from the second switch means when the water level in said at least one electrode chamber reaches said second level due to the electroosmosis and means for actuating the valve system so as to communicate said negative electrode chamber with said tank thereby to finish the cycle operation.

2. A device for supplying drinking water claimed in claim 1 in which there is further provided means for adding an additive when the natural water is supplied to the chambers, said additive being selected from the group consisting of metals and compounds containing metal.

3. A device for supplying drinking water claimed in claim 1 in which
    said water supply means comprises
    a valve through which a water line communicates with one of said electrode chambers, and
    said valve system involves means communicating said electrode chambers with each other during the supply of said natural water, and
    said second float member via said second switch means closes said communicating means when said first water level in said at least one electrode chamber is reached.

4. A device for supplying drinking water claimed in claim 2, in which
    said adding means comprises a tank for containing said additive in a liquid condition, and
    a plunger means for supplying said additive into said electrode chambers.

5. A device for supplying cationic drinking water comprising:
    a negative electrode chamber having a negative electrode,
    a positive electrode chamber having a positive electrode,
    a porous partition for communicating said chambers and through which cation particles are carried to the negative electrode chamber and anionic particles are carried to the positive electrode chamber by ionization current applied to the electrodes,
    a tank disposed under said negative electrode chamber in order to hold a water body including a plurality of said cationic particles, a valve system disposed between said tank and said negative electrode chamber, supply means for supplying natural water to both of electrode chambers, a first float member positioned in said tank, a first switch means for switching in response to the action of said first float member when said first float member is lowered to a predetermined level due to use of the water body in said tank and actuating said supply means to supply natural water to both of said electrode chambers, operatively, a second float member positioned in at least one of said electrode chambers, a second switch means for switching in response to the action of said second float member when said second float member is moved to a determined level, in such a manner that both of said electrode chambers fill with natural water until the water level in said at least one of said electrode chambers reaches the determined level actuating said second switch means for terminating the supply of natural water to said electrode chambers, and an automatic control system including:

a switch control means for starting a cycle operation by a signal from said first switch means when said first float member is lowered to said predetermined level and actuating said supply means so as to cause said chambers to fill with said natural water; means for actuating said supply means in reverse so as to stop the supply of said natural water by a signal from said second switch means when the water level reaches said determined level; means for starting said ionization current to said electrodes via actuation of said second switch means by said moving of said second float member to said determined level; a timer means operated simultaneously with the starting of the current and actuated via actuation of said second switch means by said moving of said second float member to said determined level and for stopping the current after a predetermined time period and means for actuating the valve system so as to communicate said negative electrode chamber with the tank thereby to finish the cycle operation.

6. A device for supplying drinking water claimed in claim 5 in which there is further provided means for adding an additive when the natural water is supplied to the chambers, said additive being selected from the group consisting of metals and compounds containing metal.

7. A device for supplying drinking water claimed in claim 6, in which said adding means comprises a tank for containing said additive in a liquid condition, and a plunger means for supplying said additive into said electrode chambers.

* * * * *